(No Model.)
J. NEUERT.
CLUTCH.
No. 474,183. Patented May 3, 1892.
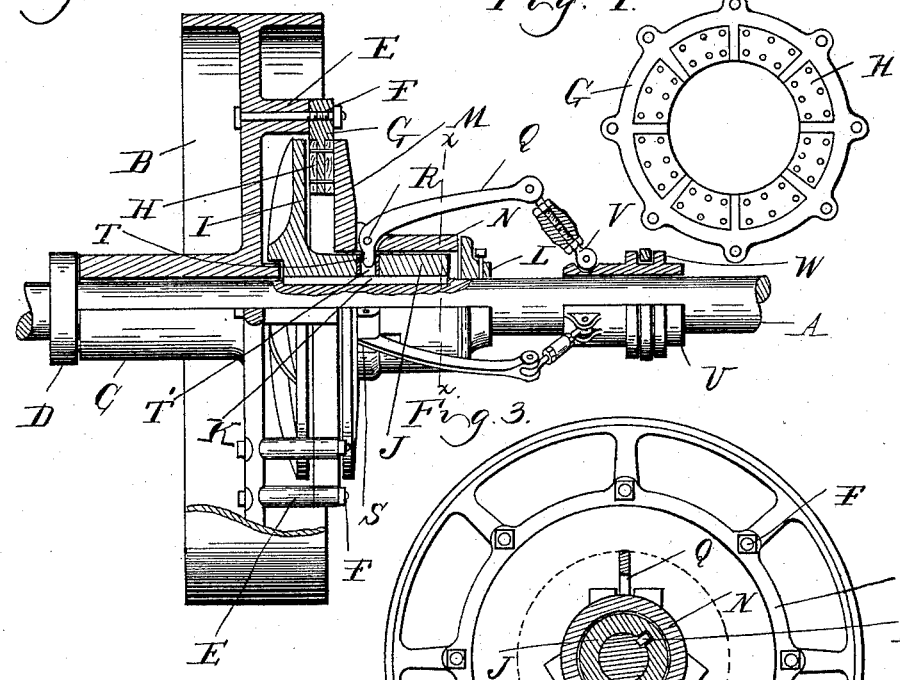
Witnesses
A. L. Hobbie
N. L. Lindop
Inventor
Jacob Neuert
By Wm. S. Sprague & Son
Attys

UNITED STATES PATENT OFFICE.

JACOB NEUERT, OF CLEVELAND, OHIO.

CLUTCH.

SPECIFICATION forming part of Letters Patent No. 474,183, dated May 3, 1892.

Application filed January 11, 1892. Serial No. 417,645. (No model.)

*To all whom it may concern:*

Be it known that I, JACOB NEUERT, a citizen of the United States, residing at Cleveland, in the county of Cuyahoga and State of Ohio, have invented certain new and useful Improvements in Friction-Clutches, of which the following is a specification, reference being had therein to the accompanying drawings.

This invention relates to new and useful improvements in friction-clutches; and the invention relates to the peculiar construction of a clutch mechanism and the means for operating the same, and, further, in the peculiar construction, arrangement, and combination of the various parts, all as more fully hereinafter described.

In the drawings, Figure 1 is a sectional elevation of a friction-clutch embodying my invention. Fig. 2 is vertical central longitudinal section showing my clutch applied as a shaft-coupling. Fig. 3 is a cross-section on line $x\,x$, Fig. 1. Fig. 4 is a detached elevation of the friction-plate.

A is the drive-shaft.

B is the pulley, having a hub C thereon, one end of this hub abutting against a collar D, fixed to the shaft. This pulley may be of any desired construction, either formed with spokes connecting the hub and flange or having a plate forming such connection.

Upon one side and a proper distance from the shaft are formed a series of lugs E, apertured to receive clamping-bolts F, which pass through apertures in the annular friction-plate G and, securely holding this plate to the pulley, form an inwardly-extending ring or flange. Around this plate upon both sides are secured the wooden friction-blocks H, which are preferably secured in recesses formed on the plate G, as will be plainly seen from inspection of Figs. 1 and 4.

I is an annular flange secured on the inner end of the hub J. This flange is arranged within the pulley and extends across the inner face of the friction-plate G, as will be plainly seen from an inspection of Fig. 1. Its hub extends some distance along the shaft and is provided with a keyway, which engages a key K in the shaft A.

L is a collar secured to the shaft A and limiting the endwise movement of the hub N.

M is an annular flange secured to the inner end of the hub N, which is sleeved upon the hub J and adapted to slide thereon, but caused to revolve therewith by means of a key O on the inner hub, engaged in a keyway P in the inner face of the hub N. The flange M extends over the outer face of the friction-plate G, as plainly shown in Fig. 1.

Q are a series of levers pivoted on pins R, arranged in apertures S in the hub N.

T are angular extensions on the levers Q, engaging in recesses T' in the hub J. These levers extend upwardly away from the flanges and at their outer ends are connected with the sliding sleeve U by means of turn-buckles V. This sleeve U is provided with an annular groove, in which the ring W engages with any suitable lever for moving the sleeve toward or from the pulley.

The parts being thus arranged, their operation is as follows: In the revolution of the shaft the keys K and O will cause the hubs J and N to revolve, carrying with them also the flanges I and M, the pulley remaining stationary, and the shaft revolving within its hub. To rotate the pulley, the operator moves the sleeve U toward the pulley, causing the turn-buckle connection V to separate the levers Q, rocking them on the pivots R. This will cause the two flanges I and M to be moved in opposite directions, clamping the friction-plate G tightly between them, causing the pulley to revolve with the shaft. To release the pulley, the operator simply withdraws the sleeve U, which separates the flanges I and M by the reverse movement of the parts. In case of serious wearing of the blocks H they may be replaced with new ones, and with this construction the machine will have a long life with little expense for repairs, giving, also, a wide friction-bearing with the flanges opposed to each other upon opposite sides of the friction-plate to positively carry the pulley without danger of slippage. The extensions T of the levers Q are provided with flat rounded ends engaging both sides of the apertures or slot T' in the single hub. This reduces the friction on the parts in operation and overcomes the necessity of lost motion of the extension T in the inner hub.

What I claim as my invention is—

In a friction-clutch, the combination, with the pulley having a friction-flange, of a sliding hub carrying a friction-flange and having recesses formed therein, a hub slidingly secured on the other hub and formed with a series of apertures and carrying a friction-flange, a series of levers fulcrumed on the outer hub, projecting through the aperture therein and engaging the side walls of the recesses in the under hub, and means for moving the levers, substantially as described.

In testimony whereof I affix my signature in presence of two witnesses.

JACOB NEUERT.

Witnesses:
L. G. HOPPER,
V. M. SCHNEIDER.